(12) United States Patent
Liao et al.

(10) Patent No.: US 7,958,295 B1
(45) Date of Patent: Jun. 7, 2011

(54) METHOD AND APPARATUS FOR FINDING SUBSET MAXIMA AND MINIMA IN SAS EXPANDERS AND RELATED DEVICES

(75) Inventors: Heng Liao, Belcarra (CA); Kuan Hua Tan, Burnaby (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 1445 days.

(21) Appl. No.: 11/389,025

(22) Filed: Mar. 27, 2006

Related U.S. Application Data

(60) Provisional application No. 60/666,723, filed on Mar. 31, 2005.

(51) Int. Cl.
*G06F 12/00* (2006.01)
(52) U.S. Cl. .......... 710/244; 711/158
(58) Field of Classification Search ............ 710/244, 710/316–317; 711/158; 370/378, 381
See application file for complete search history.

(56) References Cited

U.S. PATENT DOCUMENTS 5,408,231 A * 4/1995 Bowdon ............ 340/2.22
6,813,265 B1 * 11/2004 Henrion ............ 370/378
* cited by examiner

*Primary Examiner* — Clifford H Knoll
(74) *Attorney, Agent, or Firm* — Louis B. Allard; Borden Ladner Gervais LLP

(57) ABSTRACT

A method and apparatus are provided for finding the maxima and minima from a set of inputs data. Given a master set $K[0 \ldots N-1]$ of N keys, the current invention can pre-compute a comparison matrix, find the maximum key $K_{MAX}$ or minimum key $K_{MIN}$ from the master set $K[0 \ldots N-1]$ and indicate the key position index $P_{MAX}$ of the maximum key or $P_{MIN}$ of the minimum key. Given a subset $S[0 \ldots M-1]$ of M keys where the subset $S[0 \ldots M-1]$ belongs to the master set $K[0 \ldots N-1]$, the current invention can also find the maximum key $S_{MAX}$ or minimum key $S_{MIN}$ from the subset $S[0 \ldots M-1]$ and indicate the reference key position index $P_{MAX}$ of the maxima $S_{MAX}$ or $P_{MIN}$ of the minima $S_{MIN}$ in the master set $K[0 \ldots N-1]$. The current invention can also find a specific rank of key (example 5th largest key or 6th smallest key) and return the reference key index position in the master set $K[0 \ldots N-1]$.

9 Claims, 8 Drawing Sheets

METHOD AND APPARATUS FOR FINDING SUBSET MAXIMA AND MINIMA IN SAS EXPANDERS AND RELATED DEVICES

CROSS REFERENCE TO RELATED APPLICATIONS

The present application claims priority from U.S. Provisional Patent Application Ser. No. 60/666,723 filed on Mar. 31, 2005.

FIELD OF THE INVENTION

The present invention relates generally to Serial Attached Small Computer System Interface (SCSI) topology, also known as Serial Attached SCSI (SAS) topology, and SAS expander devices. More particularly, the present invention relates to priority based connection issues in such topologies and devices.

BACKGROUND OF THE INVENTION

Searching is the most time-consuming part of many programs or applications. The substitution of a good search method for a bad one often leads to a substantial increase in speed. In fact, most common approaches often arrange the data or the data structure so that searching is eliminated entirely by ensuring that one always knows where to find the information needed. One example is sorting out the input data in ascending or descending order before finding out the maxima, minima, or any rank of the input data. Another common way to avoid searching is to apply a link list such that it is unnecessary to search for the predecessor or successor of a given item.

Search methods vary from application to application as each method has its own peculiar virtues. Some search methodologies may work well for one application but might not be the best solution for other applications. The Linear Search method is a simple way to find the maxima or minima of a given set/subset by directly comparing each element and memorizing the maximum or minimum value. This method is suitable for applications that need to repetitively find the maxima or minima of a given set. If an application needs to process every element of a given set according to its priority key (e.g., from maximum to minimum), then the sorting based approach is better than the linear search approach. For example a five channel switch might have priority keys as shown in the given set {3, 6, 10, 4, 5} with value 3 representing priority key of channel 0, and 5 representing the priority key of channel 4. The sorting based approach will rearrange the given set into {(10,ch2), (6,ch1), (5,ch4), (4,ch3), (3,ch0)} such that both the priority keys and channel number will be memorized. The search engine will then process the channel with the highest priority key and so on. This method may cause a congestion problem in logic design with large priority keys when the channel number is increasing. The problem becomes more complicated if a subset search of the master set given above needs to be performed.

SAS protocol specifies a protocol stack that provides serial physical interconnect that can be used to connect storage devices such as Hard Disk Drives (HDD) and host devices, e.g., Host Bus Adapter (HBA), together. SAS protocol specifies the transport layer protocols to transport SCSI commands, serial Advanced Technology Attachment (SATA) commands, and management commands among storage devices. The protocol is intended for use in conjunction with SCSI and SATA command sets. The SAS protocol defines the function of a SAS expander device, which is part of the service delivery subsystem and facilities communication between SAS devices. In the general sense, the SAS expanders provide the switching and routing function among the SAS devices that are attached to the given SAS expander.

Multiple SAS end devices and SAS expander devices can be connected together to form a SAS topology. There can be one or multiple physical links connecting each pair of neighbouring devices. When there is a single physical link between two devices, the associated phy on the SAS device is called a narrow port which has a dedicated SAS Address. A phy is a generic electronics term referring to a special electronic integrated circuit or functional block of a circuit that provides physical access to a digital connection cable. When there are multiple physical links connecting two devices, the associated phys on an expander are considered to be a single wide port with all the associated phys using the same dedicated SAS Address. In other words, all links of a wide port are considered to be a common logical link from a routing perspective, although multiple simultaneous connections are allowed to pass through the wide port at the same time.

The SAS topology can be as simple as connecting multiple SAS end devices through a single SAS Expander device to a Host Bus Adapter (HBA), or as complex as connecting multiple SAS end devices through multiple SAS Expander devices to multiple HBA devices in a tree structure. Each SAS end device, SAS Expander device, and HBA device has a unique dedicated SAS Address. The connection between each SAS end device to SAS Expander device or HBA device must be a narrow port, whereas the connection between SAS expander devices or between a SAS expander device and HBA device can be a narrow port (one physical link) or a single wide port (multiple physical links).

The SAS protocol adopts the point-to-point connection mechanism. The SAS end device and HBA device have to communicate to each other through the OPEN request. The SAS Expander has to perform a point-to-point connection in order to route the OPEN request from the source phy to the target phy. The communication link is considered to be set up when an OPEN request from the SAS end device is accepted by the HBA device, or an OPEN request from the HBA device is accepted by the SAS end device. At this point, information can be transferred between the HBA device and SAS end device. The OPEN requests from Multiple SAS end devices or HBA devices can reach the SAS Expander device at the same time. The SAS Expander has to perform point-to-point switching to connect the request source phy to the target phy. When there are multiple source phys requesting to be connected to the same target phy, an arbitration process is required to resolve the connection priority.

The SAS Expander device supports the least-recently-used arbitration fairness as defined in SAS protocol. The least-recently-used arbitration fairness is designed such that the longer the open request has been queuing up, the higher priority request will win the arbitration. The arbitration priority includes three parameters: the Arbitration Wait Time (AWT), the request phy SAS Address, and the Connection Rate (CONNRATE). The AWT indicates the amount of time the source phy has been waiting for the connection to the target phy. The Arbiter looks at the AWT, SAS Address, and CONNRATE in ascending order when performing the arbitration. If two source phys that are queuing for the same target phy have the same AWT, the SAS Expander device looks at the SAS Address of the source phys. The source phy that has the largest SAS Address wins the arbitration. If both source phys have the same AWT and SAS Address, the source phy that has the highest CONNRATE wins the arbitration. In the case where the AWT, SAS Address, and CONNRATE are the same for the source phys, the SAS Expander device arbitrarily picks a winner from the source phys.

The AWT, SAS Address, and CONNRATE form the arbitration priority key for the request phy. If the SAS Expander device has N physical links (where N is an integer greater than 1), the SAS Expander device may receive up to N OPEN requests at the same time. Because the SAS topology adopts a point-to-point protocol, the SAS Expander device has to arbitrate and connect the crossbar by selecting the OPEN request phy with the highest priority key one at a time. The situation becomes more complicated as the SAS topology allows narrow port and wide port connections. If a physical link with the highest priority key is requesting a connection to the wide port whose physical links are also requesting but with lower priority keys, the SAS Expander has to connect the highest priority phy to the lowest priority phy within the wide port.

There are many known sorting and searching methodologies. Unfortunately, there is no known "best" way to sort. Each method has its own advantages and disadvantages. There are many good methods, depending on what is to be sorted and for what purpose. The logic cost and search delay is of utmost importance from the SAS Expander design perspective. In the broader field of sorting and searching, some known approaches relating to the art finding maxima and minima include the straight insertion sorting method, the linear search method, the sorting based method, and the link list method.

Straight insertion sorting is the simplest method to search and sort a given set into priority order, and is quite efficient for small N. It is unbearably slow for large N unless the input is nearly in order. This searching method is also very costly for hardware design for large N as muxes are required to sort the insertion key in to priority list. The linear search is the most fundamental search method. It directly compares every element in the given set and memorizes the maximum key or minimum key. At the end of each loop, the memorized key represents the maxima or minima of the given set. The sorting based approach is when given set is sorted into a priority list with the maxima being the first element of the sorted list and the minima being the last element of the sorted list. The sorting method can use any methodology, for example the straight insertion method as mentioned above. The drawback is that if there is more than 1 master set to be sorted, e.g., to find minimum of several subsets, all of the master and subsets need to be sorted before the maxima and minima can be found. This is slow and very costly in hardware design. The link list approach, in general, combines the linear search and sorting based approaches. Each element in the master set will have an associate index to indicate the next maximum in the master set. However this method is very slow as N linear searches need to be performed in order to determine the priority index for all the N elements.

It is, therefore, desirable to provide a sorting and searching approach that overcomes at least one drawback of known approaches.

SUMMARY OF THE INVENTION

It is an object of the present invention to obviate or mitigate at least one disadvantage of previous searching and sorting methodologies.

The present invention provides an apparatus and method to repetitively find the maxima and minima for various subsets (e.g., wide port physical links of a SAS expander) from a common master set (e.g., all physical links available to the SAS expander). Both the wide-port subset and master set can be updated immediately when a connection has been made or removed between two physical links. The present invention provides a method for finding either a highest or lowest priority request source phy with the optimum logic cost and searching delay along with a method for finding a specific rank of a subset in a SAS expander.

In a first aspect, the present invention provides a computer-readable program product for finding a highest priority request source phy in a device such as, but not limited to, a SAS expander, the program product including: a comparison-matrix code capable of computing a comparison matrix by comparing priority keys from all input phys of the SAS expander; a maxima-row-wise code capable of using a maxima input subset mask to mask off all of an unused row of the comparison matrix; a maxima-function code capable of finding an all zero column using a column-wise NOR function; a maxima-column-wise code capable of using the maxima input subset mask to mask off all of an unused column of the comparison matrix; a maxima-index-wise code capable of using a priority encoder to find an index of maxima corresponding to the highest priority request source phy; and a maxima-update code capable of updating the maxima input subset mask by setting a 1 to the index of maxima.

In a second aspect, the present invention provides a computer-readable program product for finding a lowest priority request source phy in a device such as, but not limited to, a SAS expander, the program product including: comparison-matrix code capable of computing a comparison matrix by comparing priority keys from all input phys of the SAS expander; a minima-column-wise code capable of using a minima input subset mask to mask off all of an unused column of the comparison matrix; minima-function code capable of finding an all zero row using a row-wise NOR function; a minima-row-wise code capable of using the minima input subset mask to mask off all of an unused row of the comparison matrix; a minima-index-wise code capable of using the priority encoder to find an index of minima corresponding to the lowest priority request source phy; and a minima-update code capable of updating the minima input subset mask by setting a 1 to the index of minima.

In a third aspect, the present invention provides a computer-readable program product for finding a specific rank of a subset in device such as, but not limited to, a SAS expander, the program product including: a comparison-matrix code capable of computing a comparison matrix by comparing priority keys from all input phys of the SAS expander; a maxima-row-wise code capable of using a maxima input subset mask to mask off all of an unused row of the comparison matrix; an equivalence-matrix code capable of computing an equivalence matrix by finding equal priority keys from all the input phys of the SAS expander, where the maxima-row-wise code also being capable of using the maxima input subset mask to mask off all of an unused row of the equivalence matrix; a counting code capable of computing a comparison matrix count by counting each 1 from row=0 to row=N minus 1 for each column and computing an equivalence matrix count by counting each 1 from row=0 to row=column minus 1 for each column; a summation code capable of adding together the comparison matrix count and the equivalence matrix count to form a rank matrix; and a ranking code capable of using the maxima input subset mask to mask an unused column of the rank matrix to −1, where a final counter value of each column indicates a rank of each phy and a present value of −1 indicates a phy corresponding to the present value is an unused phy.

In a fourth aspect, the present invention provides a method for finding a highest priority request source phy in a device such as, but not limited to, a SAS expander, the method including: computing a comparison matrix by comparing priority keys from all input phys of the SAS expander; using a maxima input subset mask to mask off all of an unused row of the comparison matrix; finding an all zero column using a column-wise NOR function; using the maxima input subset mask to mask off all of an unused column of the comparison matrix; using a priority encoder to find an index of maxima corresponding to the highest priority request source phy; and updating the maxima input subset mask by setting a 1 to the index of maxima.

In a fifth aspect, the present invention provides a method for finding a lowest priority request source phy such as in, but not limited to, a SAS expander, the method including: computing a comparison matrix by comparing priority keys from all input phys of the SAS expander; using a minima input subset mask to mask off all of an unused column of the comparison matrix; finding an all zero row using a row-wise NOR function; using the minima input subset mask to mask off all of an unused row of the comparison matrix; using the priority encoder to find an index of minima corresponding to the lowest priority request source phy; and updating the minima input subset mask by setting a 1 to the index of minima.

In a sixth aspect, the present invention provides a method for finding a specific rank of a subset such as in, but not limited to, a SAS expander, the method including: computing a comparison matrix by comparing priority keys from all input phys of the SAS expander; using a maxima input subset mask to mask off all of an unused row of the comparison matrix; computing an equivalence matrix by finding equal priority keys from all the input phys of the SAS expander; using the maxima input subset mask to mask off all of an unused row of the equivalence matrix; computing a comparison matrix count by counting each 1 from row=0 to row=N minus 1 for each column; computing an equivalence matrix count by counting each 1 from row=0 to row=column minus 1 for each column; adding together the comparison matrix count and the equivalence matrix count to form a rank matrix; and using the maxima input subset mask to mask an unused column of the rank matrix to −1; wherein a final counter value of each column indicates a rank of each phy and a present value of −1 indicates a phy corresponding to the present value is an unused phy.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures.

DETAILED DESCRIPTION

Generally, the present invention provides a method and apparatus for finding the maxima and minima from a set of input data. Given a master set $K[0 \ldots N-1]$ of N keys (where N is an integer greater than 0), the current invention can pre-compute a comparison matrix, find the maximum key $K_{MAX}$ or minimum key $K_{MIN}$ from the master set $K[0 \ldots N-1]$ and indicate the key position index $P_{MAX}$ of the maximum key or $P_{MIN}$ of the minimum key. Given a subset $S[0 \ldots M-1]$ of M keys where the subset $S[0 \ldots M-1]$ belongs to the master set $K[0 \ldots N-1]$, the current invention can also find the maximum key $S_{MAX}$ or minimum key $S_{MIN}$ from the subset $S[0 \ldots M-1]$ and indicate the reference key position index $P_{MAX}$ of the maxima $S_{MAX}$ or $P_{MIN}$ of the minima $S_{MIN}$ in the master set $K[0 \ldots N-1]$. The current invention can also find a specific rank of key (example 5th largest key or 6th smallest key) and return the reference key index position in the master set $K[0 \ldots N-1]$.

Embodiments of the present invention provide a method to repetitively find the maxima and minima for various subsets (i.e., wide port physical links) from a common master set (i.e., available physical links). Both the wide-port subset and master set can be updated immediately when a connection has been made or removed between two physical links.

Embodiments of the present invention address the Priority based Connection issue in SAS topology and SAS Expander devices. However, the same concept can be applied to any searching or sorting mechanism that needs to be prioritized without straying from the intended scope of the present invention. The present invention involves converting the priority keys into a logical matrix that is small enough to be kept in the memory. The maxima and minima can be found by repeatedly performing logical operations using the pre-computed matrix. On the other hand, the method of finding specific rank can be multi-tasking by searching the rank of each input phy in parallel without storing the logical matrix in the memory. It is to be noted that the terms maxima and minima as used herein can represent a single maximum/minimum or a plurality thereof.

Figure 1:
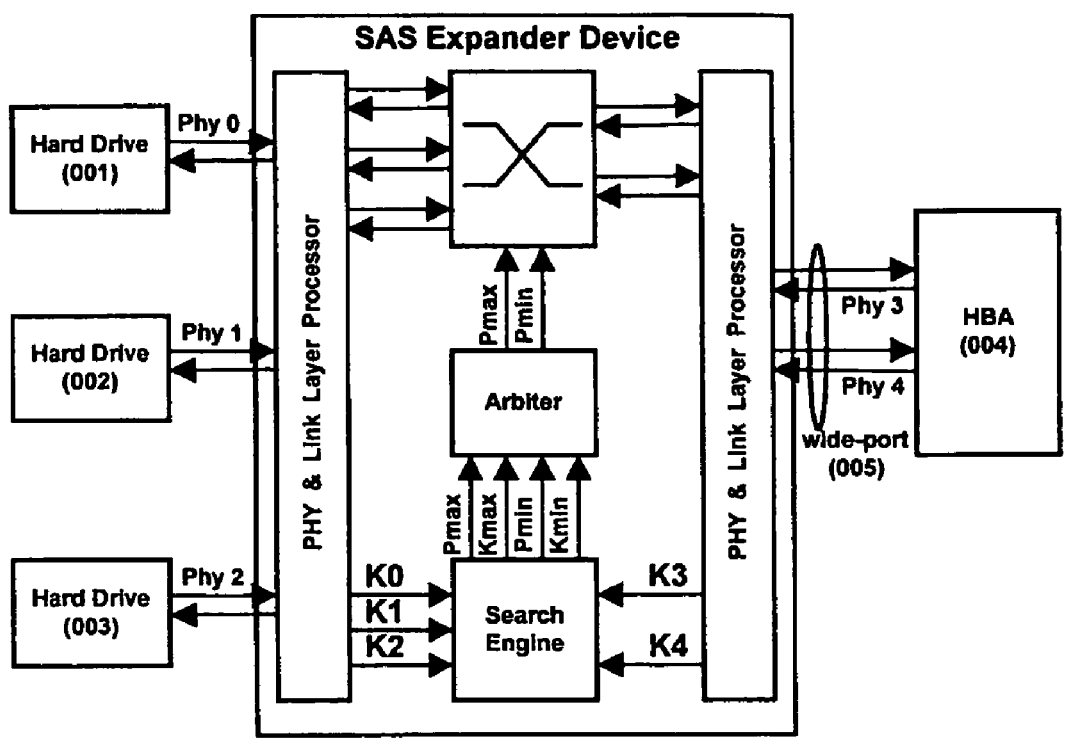
FIG. 1 is a block diagram of a SAS expander device.

As described earlier, a SAS topology can contain a number of hosts, targets, and expander devices. The SAS Expander is a multiple port device providing switching functionality among host, target and other expander devices allowing any device to exchange information with any other device in the topology. FIG. 1 illustrates a general SAS configuration that includes one SAS Expander Device, an HBA device and three SAS end devices. The HBA (004) is connected to the SAS Expander Device (000) through a wide port that comprises Phy 3 and Phy 4 physical links. The three SAS end devices (001, 002, 003) are connected to the SAS Expander Device through three narrow ports (Phy 0, Phy 1, Phy 2). Assuming the HBA device (004) wants to access the end devices 001 and 002, the OPEN requests will be sent on Phy 3 and Phy 4. At the same time, the SAS end devices (001, 002 and 003) have information ready (from previous request) to send back to the HBA (004). The OPEN requests from SAS end devices (001, 002 and 003) are also presented to the SAS Expander device.

The Link Layer Processor in the SAS Expander device extracts the arbitration keys from the OPEN requests and presents them to the Search Engine. Assuming that the SAS Expander device receives the arbitration keys $K_0$ from Phy 0, $K_1$ from Phy 1, $K_2$ from phy2, $K_3$ from Phy 3 and $K_4$ from Phy 4 at the same time, then the Search Engine has the following input data:

Arbitration Keys for Request source phy=$\{K_0, K_1, K_2, K_3, K_4\}$

Arbitration Keys for Request target phy=$\{\{K_0\}, \{K_1\}, \{K_2\}, \{K_3, K_4\}\}$ In the above example, the request source phys can be treated as a request subset (which is the same as master set in this case) as each input phy has an open request. The request target phy is a list of target subsets with each narrow-port including 1 arbitration key (the target phy itself) and each wide-port including more than 1 arbitration key (the arbitration keys from all the phys belong to the wide-port). The search engine has to connect the highest priority key from the request source phy to the lowest priority from the target subset one at a time until all the request phys has been served.

Figure 2:
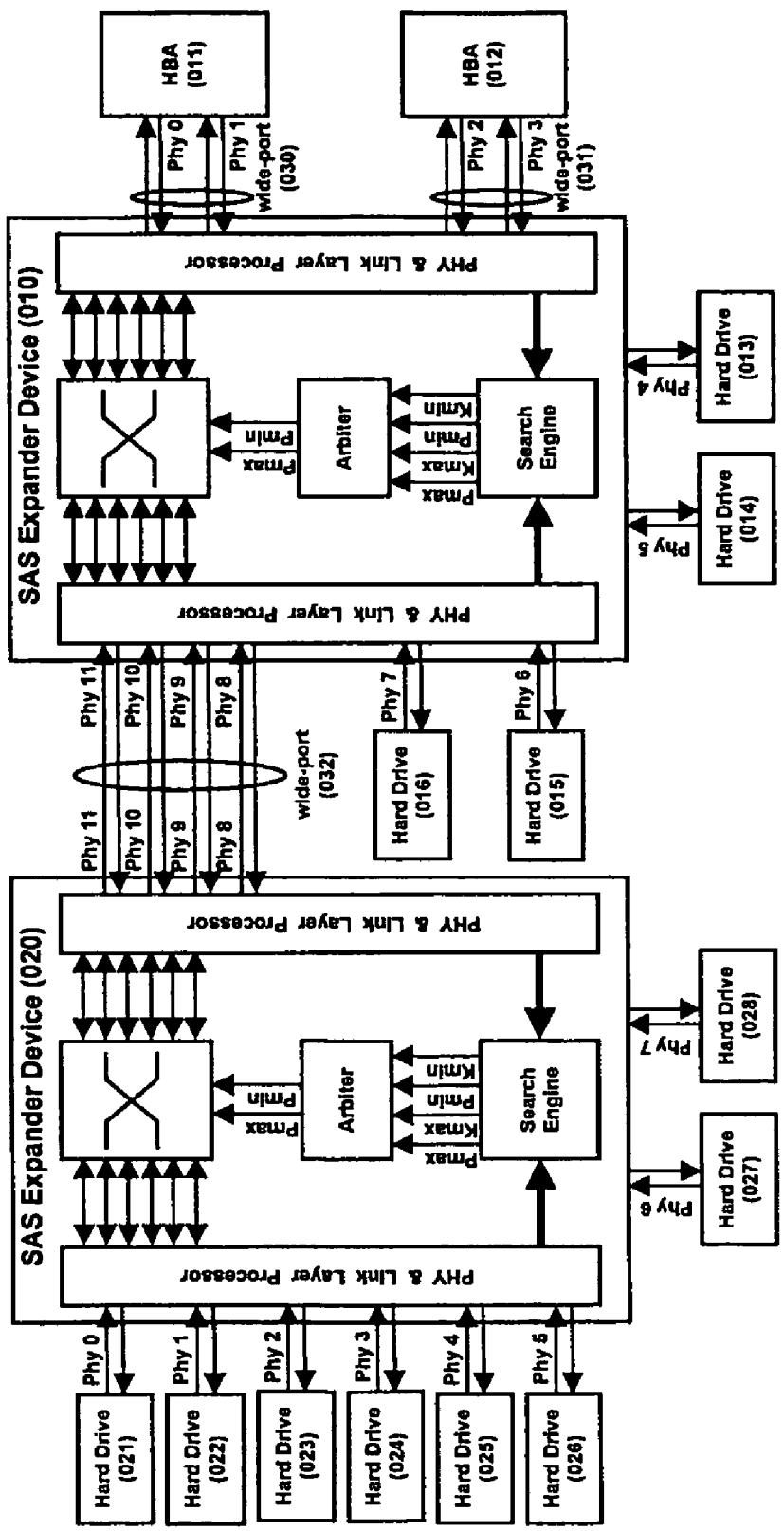
FIG. 2 is a block diagram of a cascade of two SAS expander devices together.

FIG. 2 illustrates a SAS configuration that includes two SAS Expander Devices, two HBA devices and a plurality of SAS end devices. In FIG. 2, the SAS Expander device (010) comprises 12 physical links with four physical links connected to two HBA devices (011 and 012), four physical links connected to four hard drives (013 to 016) and four physical links connected to the expander device (020). There are three wide-port and four narrow-port configurations, with two wide-port physical links (030) connected to HBA (011), two wide-port physical links (031) connected to HBA (012), four wide-port physical links (032) connected to expander device (020) and four narrow-port physical links each connected to a hard drive.

Similarly, the SAS Expander device (020) comprises 12 physical links with four physical links connected to the expander device (010) and eight physical links connected to hard drives (021 to 028). There are eight narrow-port and one wide-port and configurations, with four wide-port physical links connected to the expander device (010) and eight narrow-port physical links each connected to a hard drive. In the expander device (010), assuming that all the physical links have an OPEN request to be resolved by the switch, 12 arbitration keys $K_{10}$ to $K_{1b}$ from phy 0 to phy 11 exist at the same time. The Search Engine then has the following input data:

Arbitration Keys for Request source phy=$\{K_{10}, K_{11}, K_{12}, K_{13}, K_{14}, K_{15}, K_{16}, K_{17}, K_{18}, K_{19}, K_{1a}, K_{1b}\}$ Arbitration Keys for Request target phy=$\{\{K_{10}, K_{11}\}, \{K_{12}, K_{13}\}, \{K_{14}\}, \{K_{15}\}, \{K_{16}\}, \{K_{17}\}, \{K_{18}, K_{19}, K_{1a}, K_{1b}\}\}$ Again, the request source phy can be treated as master set and the request target phy should consist of a list of narrow-port and wide-port subsets. In the above example, there are four narrow-port subsets and three wide-port subsets. If there is a higher priority request phy targeting for the wide-port (032) and the wide-port (032) also has request phys waiting to be connected (as shown in target subset $\{K_{18}, K_{19}, K_{1a}, K_{1b}\}$), a minimum has to be found from the wide-port (032) subset. The request phy with the minimum priority key from the wide-port (032) will be rejected and be connected from the request phy with higher priority. In the expander device (020), assuming that all the physical links have an OPEN request to be resolved by the switch, 12 arbitration keys $K_{20}$ to $K_{2b}$ from phy 0 to phy 11 exist at the same time. The Search Engine then has the following input data:

Arbitration Keys for Request source phy=$\{K_{20}, K_{21}, K_{22}, K_{23}, K_{24}, K_{25}, K_{26}, K_{27}, K_{28}, K_{29}, K_{2a}, K_{2b}\}$ Arbitration Keys for Request target phy=$\{\{K_{20}\}, \{K_{21}\}, \{K_{22}\}, \{K_{23}\}, \{K_{24}\}, \{K_{25}\}, \{K_{26}\}, \{K_{27}\}, \{K_{28}, K_{29}, K_{2a}, K_{2b}\}\}$ In general, consider the following definitions:
$K_{max}$=Maximum Key for Request source phy subset
$P_{max}$=Request source Phy of $K_{max}$
$K_{min}$=Minimum Key for Request target phy subset
$P_{min}$=Request target Phy of $K_{min}$ The Search Engine will search through the source phy subset to find the maximum arbitration key $K_{max}$. The index position of $K_{max}$ indicates the source phy $P_{max}$ which has the highest priority to be connected first. The search engine will then search through the target phy subset to find the minimum arbitration key $K_{min}$ from either the narrow port or wide port. The index position of $K_{min}$ indicates the target phy $P_{min}$ that needs to be connected to. The Arbiter will perform the arbitration and connect the $P_{max}$ phy to the $P_{min}$ phy. This will allow the OPEN request from the source phy to be able to send to the target phy. If the $P_{min}$ phy has no OPEN request (e.g. no request from the target phy), the Link Layer Processor will transmit the OPEN request. If the $P_{min}$ phy has an OPEN request, the Link Layer Processor will reject the OPEN request in the target phy and allow the OPEN request from the source phy to go through.

The Search Engine and Arbiter will repeatedly perform the above functions to connect the next highest priority request phy to the target phy until all the request phys have been served. The same methodology can be repeatedly used by masking off the $K_{max}$ from the source phy subset so that the next highest priority request phy can be found. Similarly, the $K_{min}$ will be masked off from the target phy subset so that the next lowest priority request phy can be found.

Using the SAS expander device (010) in FIG. 2 as an example, assume arbitration key $K_{11}$ is the maximum arbitration key. A search from the source phy subset will find Phy 1 ($P_{max}$ phy) as the highest priority request phy. Assume that the Phy 1 is requested to connect to wide-port (032) with $K_{18}$ as the lowest priority key in that wide-port subset. A search in the wide-port target phy subset $\{K_{18}, K_{19}, K_{1a}, K_{1b}\}$ indicates that Phy 8 is the lowest priority request phy in the wide-port (032). Therefore, the arbiter will connect the request Phy 1 to the target Phy 8. An arbitration key mask will be set on Phy 1 and Phy 8 to remove $K_{max}$ and $K_{min}$ from the search engine.

The following summarizes the above problem in mathematical terms:

Step 1. Given a total order set of keys $K_S=\{K_0, K_1, K_2, \ldots, K_{N-1}\}$, where:
  N is the total number of keys;
  Reflexivity: $a \leq a$ for all $a \in K_S$;
  Weak anti-symmetry: $a \leq b$ and $b \leq a$ implies $a=b$;
  Transitivity: $a \leq b$ and $b \leq c$ implies $a \leq c$; and
  Comparability (i.e., trichotomy law): For any $a, b \in K_S$, either $a \leq b$ or $b \leq a$.

Step 2. For any given subsets $S_{src} \subseteq K_S$ and $S_{tgt} \subseteq K_S$, it is desirable to:
  i. find the maxima of the source subset:
    $K_{max}$=MAX($S_{src}$) implies $K_{max} \in S_{src}$ and $K_{max} \geq X$, for any $X \in S_{src}$
  ii. find the index position of $K_{max}$ with reference to the total keys of $K_S$:
    $P_{max}$=INDEX($K_S$) implies $0 \leq P_{max} \leq N-1$ where $P_{max}$ is the index position of $K_{max}$ iii. find the minima of the target subset:
$K_{min}$=MIN($S_{tgt}$) implies $K_{min} \in S_{tgt}$ and $K_{min} \geq X$, for any $X \in S_{tgt}$ iv. find the index position of $K_{min}$ with reference to the total keys of $K_S$:
$P_{min}$=INDEX($K_S$) implies $0 \leq P_{min} \leq N-1$ where $P_{min}$ is the index position of $K_{min}$ Step 3. Repeat step 2 for any given subsets $S_{src}$ and $S_{tgt}$ until $S_{src}$={ } (when all source phys have been served). For each iteration: $S_{src}=S_{src}-K_{max}-K_{min}$ Note that the step 3 only applies to the specific problem in a SAS expander. In general terms, step 3 should be repeated until all the subsets are empty. This depends on the type of application the methodology is applied to.

Further, embodiments of the present invention present a method and apparatus for repeatedly finding the maxima and minima from a set of inputs data. Given a master set $K[0 \ldots N-1]$ of N arbitration keys, the search engine finds the highest priority key $K_{MAX}$ from the request source phy and attempts to connect the highest priority request phy $P_{MAX}$ to the lowest priority target phy $P_{MIN}$. The search engine repeatedly finds the next highest priority request source phy $P_{MAX}$ and the next lowest priority request target phy $P_{MIN}$ until all the request phys have been served. For each iteration, the highest priority key $K_{MAX}$ and the lowest priority key $K_{MIN}$ within the target phys are removed from the request phy subset in order to determine the next highest priority key and lowest priority key.

Still further, embodiments of the present invention perform the sorting and searching function by pre-computing a comparison matrix using the input phy master set. The highest priority key can be found by using the request source phy subset as an input mask to extract the highest priority request source phy from the matrix. Similarly, the lowest priority key can be found by using the request target phy subset as input mask to extract the lowest priority request target phy from the matrix. This step can be repeatedly performed using the updated source phy subset and target phy subset. The comparison matrix can then be updated again with the new input keys after all the source phys have been served. This input definition is a follows: Given a total of N input phys, a master key set of $K[0 \ldots N-1]$ can be defined as:

$$K_S=\{K_0, K_1, K_2, \ldots, K_{N-1}\} \quad \text{(Eq.1)}$$

where X is an integer $0 \leq X \leq N-1$, and $K_X$ is the priority key of the input phy.

The index position in the master key represents the input phy number. For instance $K_0$ is the priority key for input phy 0. If an input phy did not have any request (or no input), the priority can be replaced by 0 or any ambiguous number. The value of the non-request phy is not important as it will be masked off by $H_{MASK}$ or $L_{MASK}$ which are defined later.

To find the maxima, there exists a maxima input subset mask $H[0 \ldots N-1]$ as follows:

$$H_{MASK}=\{H_0, H_1, H_2, \ldots, H_{N-1}\} \quad \text{(Eq.2)}$$

where X is an integer $0 \leq X \leq N-1$, and $H_X$ is a logical variable of 0 or 1.

The length and index position of the maxima subset mask $H_{MASK}$ are preferably the same as the master set $K_S$. This means $H_{MASK}$ has N-1 mask and each key $H_X$ represents the valid mask of input phy "X". When the $H_X$ is set to 1, this means that the input phy comprises a valid key that needs to be considered by the search engine. When the $H_X$ is set to 0, this means that the input phy either did not have a valid key or should be ignored by the search engine. Under some conditions, an input mask is not available. For instance, a subset comprising various priority keys from the master set can be given and the highest priority key and the key index are to be found with reference to the master set from the given subset. In this case, the subset mask is calculated and defined from the subset keys before performing the search.

Suppose an input subset $S_{max}[0 \ldots M-1]$ is presented as below:

$$S_{max}=\{S_0, S_1, \ldots, S_{M-1}\} \quad \text{(Eq.3)}$$

where M is an integer $0 \leq M \leq N-1$, X is an integer $0 \leq X \leq N-1$, and $S_X$ is the priority key of subset $S_{max}$ and $S_{max} \subset K_S$ Then there exists an temporary subset $T_{max}$ such that:

$$T_{max}=\{T_0, T_1, \ldots, T_{N-1}\} \quad \text{(Eq.4)}$$

where X is an integer $0 \leq X \leq N-1$, Y is an integer $0 \leq Y \leq M$, and $T_X=K_X$ if $(S[Y]=K_X)$ otherwise 0.

The $H_{MASK}$ can be obtained as below:

$$H_{MASK}=T_{MAX}/K_S \quad \text{(Eq.5)}$$

For example,
$K_S=\{2, 4, 4, 9, 5, 9, 3\}$ and
$S_{MAX}=\{2, 4, 4, 5, 3\}$.

From equation (4),
$T_{MAX}=\{2, 4, 4, 0, 5, 0, 3\}$ and $H_{MASK}$ can be calculated from equation (5) as $H_{MASK}=\{1, 1, 1, 0, 1, 0, 1\}$.

Similarly there exists a minima input subset mask $L[0 \ldots N-1]$ as:

$$L_{MASK}=\{L_0, L_1, L_2, \ldots, L_{N-1}\} \quad \text{(Eq.6)}$$

where X is an integer $0 \leq X \leq N-1$, and LX is a logical variable of 0 or 1.

The logical Boolean functions will now be defined. A logical variable is a variable which has three distinctive properties:
1. The logical variable may assume one or the other of only TWO possible values.
2. The values are expressed by declarative statements.
3. The two possible values expressed by the declarative statements must be such that they are mutually exclusive.

Table 1 illustrates the truth table of variable A and B, and the logical function defined by the truth table.

TABLE 1

| A | B | Z = A AND B | Z = A OR B | Z = NOT A |
|---|---|---|---|---|
| 0 | 0 | 0 | 0 | 1 |
| 0 | 1 | 0 | 1 | 1 |
| 1 | 0 | 0 | 1 | 0 |
| 1 | 1 | 1 | 1 | 0 |

A logical AND function can be expressed by writing the dependence output Z on A and B as $$Z=A \text{ AND } B \quad \text{(Eq.7a)}$$

or $$Z=A \cdot B \quad \text{(Eq.7b)}$$

A logical OR function can be expressed as $$Z=A \text{ OR } B \quad \text{(Eq.7c)}$$

or $$Z=A+B \quad \text{(Eq.7d)}$$

A logical NOT function can be expressed as $$Z=\text{NOT } A \quad \text{(Eq.7e)}$$

or $$Z=\overline{A} \quad \text{(Eq.7f)}$$

The logical functions are widely used in this description. In the above example, the $H_{MASK}$ and $L_{MASK}$ are declared as the N vectors whose value is either logical 1 to indicate valid key or logical 0 to indicate invalid key. The $H_{MASK}$ and $L_{MASK}$ are logical vectors which will be expressed as logical functions as described in the equations in next sections related to the search mechanism of the present invention.

Figure 3:
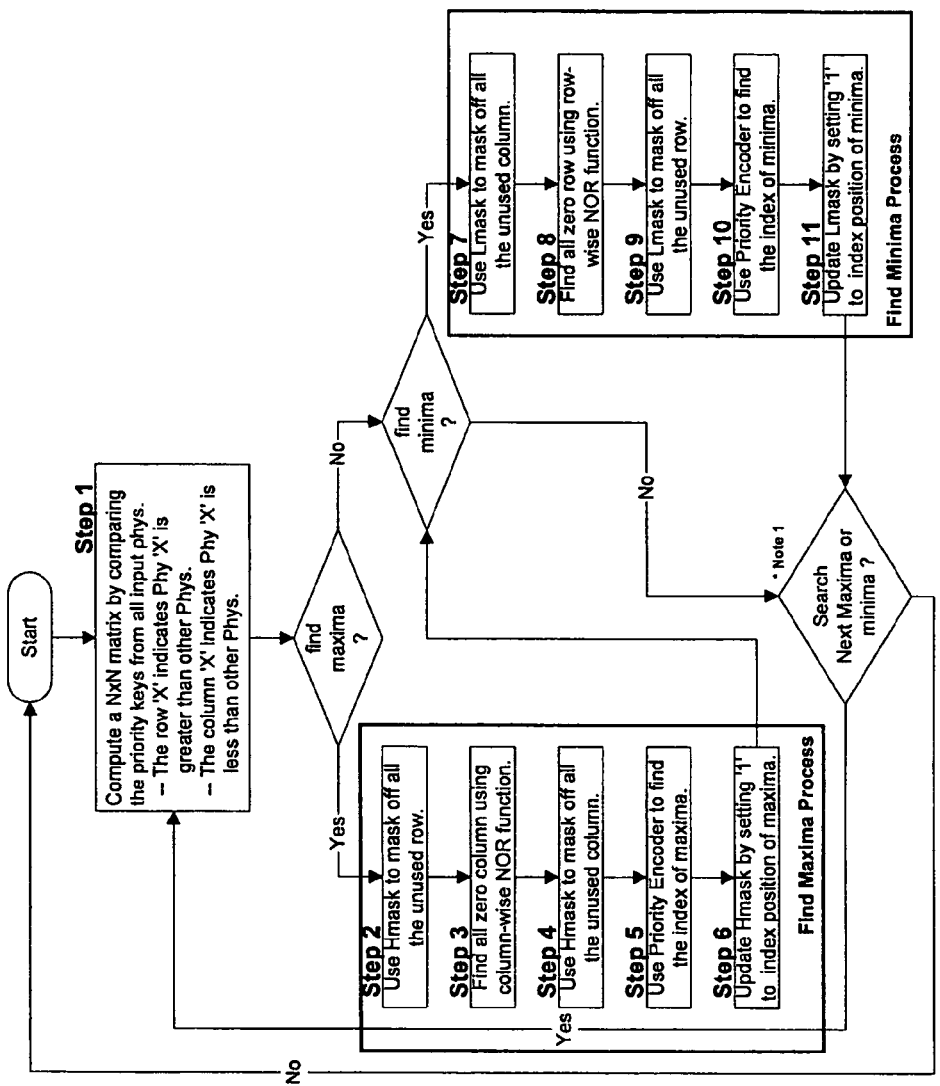
FIG. 3 is a flow chart showing steps in a method for finding maxima and minima according to an embodiment of the present invention.

FIG. 3 illustrates a process of finding the maxima and minima according to an embodiment of the present invention. From the previous section, the following have been defined: the master set K[0 . . . N−1]; the bit mask $H_{MASK}$ that defines the subset mask for maxima search; and the bit mask $L_{MASK}$ that defines the subset mask for minima search.

The first step in accordance with the method according to an embodiment of the present invention is where the search engine computes a two dimension Comparison Matrix using the master set. The matrix C[N−1][N−1] comprises N row×N columns which value is defined as:

$$C_{[i][j]} = 1 \text{ if } (K_{[i]} > K_{[j]}), \text{ otherwise } 0$$

where
i=number of row and $0 \leq i \leq N-1$
j=number of column and $0 \leq j \leq N-1$.

Therefore, the matrix C is a two dimension vector consisting of N×N logical variables defined as:

$$C_{STEP1} = \begin{bmatrix} C(K_0 > K_0) & C(K_0 > K_1) & C(K_0 > K_2) & \ldots & C(K_0 > K_{N-1}) \\ C(K_1 > K_0) & C(K_1 > K_1) & C(K_1 > K_2) & \ldots & C(K_1 > K_{N-1}) \\ C(K_2 > K_0) & C(K_2 > K_1) & C(K_2 > K_2) & \ldots & C(K_2 > K_{N-1}) \\ \ldots & \ldots & \ldots & \ldots & \ldots \\ C(K_{N-1} > K_0) & C(K_{N-1} > K_1) & C(K_{N-1} > K_2) & \ldots & C(K_{N-1} > K_{N-1}) \end{bmatrix} \quad (8)$$

$$C_{STEP1} = \begin{bmatrix} C_{0,0} & C_{0,1} & C_{0,2} & \ldots & C_{0,N-1} \\ C_{1,0} & C_{1,1} & C_{1,2} & \ldots & C_{1,N-1} \\ C_{2,0} & C_{2,1} & C_{2,2} & \ldots & C_{2,N-1} \\ \ldots & \ldots & \ldots & \ldots & \ldots \\ C_{N-1,0} & C_{N-1,1} & C_{N-1,2} & \ldots & C_{N-1,N-1} \end{bmatrix}$$

where
i is an integer $0 \leq i \leq N-1$
j is an integer $0 \leq j \leq N-$
$C_{[i][j]}$ is a logical variable 0 or 1

$$C_{[i][j]} = 1 \text{ when } K_i > K_j$$
$$= 0 \text{ when } K_i \leq K_j$$

Each element of the comparison matrix has a logical value of 0 or 1. For example if $C_{0,1}$ has a logical value of 1, this indicates that Phy 0 has priority key $K_0$ greater than the priority key $K_1$ of Phy 1. If $C_{0,1}$ has a logical value of 0, this indicates that Phy 0 has priority key $K_0$ equal to or less than the priority key $K_1$ of Phy 1. In general, a logical '1' in the row X of the matrix indicates if the priority key of Phy X is greater than any other Phys. A logical '1' in the column X of the matrix indicates if the priority key of Phy X is less than other Phys.

After the Comparison Matrix has been computed, the maxima can be found by masking off the row of the matrix C using the $H_{MASK}$. An all zeros column (for example column 3) indicates that the priority key of Phy 3 is not less than any other Phys and therefore should be the maximum, or maxima.

There will be more than 1 maximum in the current search if there is more than 1 all zeros column. A most significant bit (MSB) or least significant bit (LSB) priority encoder can be used to sequentially pick the maxima for the current search. The $H_{MASK}$ will then be updated to remove the current maxima from the search methodology. This process is repeated until the $H_{MASK}$ is all ones.

The minima can be found in a similar fashion by swapping the row and column of the matrix. The $L_{MASK}$ is used to mask off the column of the matrix C and find an all zeros row in the matrix. An all zeros row (for example row 3) indicates that the priority key of Phy 3 is not greater than any other Phys and therefore should be the minimum. There will be more than 1 minimum in the current search if there is more than 1 all zeros row. Again, an MSB or LSB priority encoder can be used to sequentially pick the minima for the current search.

The second step in accordance with the method according to an embodiment of the present invention is finding the maxima where Mask the row of the matrix C using $H_{MASK}$ vector. A two dimensional matrix is obtained. The row of the matrix $C_{STEP2}$ indicates the comparison vector of a given input priority key greater than the other priority keys. For example, the row 0 indicates the priority key of input index 0 (or phy 0) greater than other priority keys. If a given input phy did not have a priority key for comparison or that particular input is ignored, the $H_{MASK}$ for that input phy is set to 0. This will zero out the logical values for the given row.

The third step in accordance with the method according to an embodiment of the present invention is where the process generates a one dimension matrix $C_{STEP3}$ by performing a NOR operation on the logical values of the column in $C_{STEP2}$. The logical function $f(C_X)$ defines the NOR function of all the logical values in a single column X as $$f(C_X) = \overline{(H_0 \cdot C_{0,X} + H_1 \cdot C_{1,X} + H_2 \cdot C_{2,X} + \ldots + H_{N-1} \cdot C_{N-1,X})} \quad (10)$$

Therefore, the matrix $C_{STEP3}$ can be expressed as $$C_{Step3} = [f(C_0) f(C_1) f(C_2) \ldots f(C_{N-1})] \quad (11)$$

where
X is an integer $0 \leq X \leq N-1$
$f(C_X)$ is a logical variable 0 or 1

This means that each column of $C_{STEP3}$ will be set to 1 if all the column values of $C_{STEP2}$ are 0. The logical function $f(C_X)$ is used to detect if the index X comprises the highest priority key. If the column X is all zero, this means that the priority key for index X is greater than or equal to all the priority keys.

The fourth step in accordance with the method according to an embodiment of the present invention is to mask the column of the matrix $C_{STEP3}$ using $H_{MASK}$ vector. A new matrix is obtained as:

$$C_{Step4} = C_{Step3} \cdot H_{MASK}$$

$$C_{Step4} = [f(C_0) f(C_1) f(C_2) \ldots f(C_{N-1})] \text{ AND } [H_0 H_1 H_2 \ldots H_{N-1}]$$

$$C_{Step4} = [H_0 \cdot f(C_0) \; H_1 \cdot f(C_1) \; H_2 \cdot f(C_2) \ldots H_{N-1} \cdot f(C_{N-1})] \quad (12)$$

The $H_{MASK}$ vector is used to mask off the unwanted or invalid input phy. For a given index X which did not have an input priority key or for which the input key is ignored, the masked input $H_X$ is set to 0 which will ensure the output result of $H_X \cdot f(C_X)$ returns logical 0. For any index X with a valid priority key, the output result of $H_X \cdot f(C_X)$ depends on the logical function $f(C_X)$. If the $f(C_X)$ returns logic 1, this indicates the associated index X has the highest priority key (maxima).

The fifth step in accordance with the method according to an embodiment of the present invention is where the matrix $C_{STEP4}$ is expressed in the vector format which comprises N logical values representing the maxima searching result associated with each input phy. Suppose a given input subset comprises 2 highest priority keys, e.g., {2, 4, 4, 9, 5, 9, 3} which has maxima 9 on phy index 3 and phy index 5. In this case, the matrix $C_{STEP4}$ will return search result {0, 0, 0, 1, 0, 1, 0} which has two logical 1 in the vector, indicates phy 3 and phy 5 both are maxima. A priority encoder is preferably employed to resolve this issue. Either an LSB priority encoder or MSB priority encoder is preferably employed to find the index.

$$C_{Step4} = [H_0 \cdot f(C_0) \; H_1 \cdot f(C_1) \; H_2 \cdot f(C_2) \ldots H_{N-1} \cdot f(C_{N-1})]$$

where

X is an integer $0 \leq X \leq N-1$ $H_X \cdot f(C_X)$ is a logical 0 or 1

$P_{MAX}$ = Minimum phy index of $C_{step4}$ for any $H_x \cdot f(C_x) = 1$ \quad (13a)

$P_{MAX}$ = Maximum phy index of $C_{step4}$ for any $H_x \cdot f(C_x) = 1$ \quad (13b)

The equation (13a) is used to find the smallest phy index that indicates the maxima. An LSB priority encoder is required. The equation (13b) is used to find the highest phy index that indicates the maxima. An MSB priority encoder is preferably employed.

The sixth step in accordance with the method according to an embodiment of the present invention is to repeatedly find the next maxima for the given subset, the $H_{MASK}$ has to be updated by setting the $HP_{MAX}$ value to 0 and repeat step 2 to step 4. This will ignore the maxima from the current search cycle in the C matrix so that a new maxima from the next search cycle can be found. This process should be repeated until the $H_{MASK}$ subset comprises all logical 0. In this case, the repeatedly searching cycles will be stopped. The priority keys in the master set $K_S$ can be reloaded and the C matrix will be recomputed again. This will restart a new search process to repeatedly find the maxima from the new master set.

Figure 4:
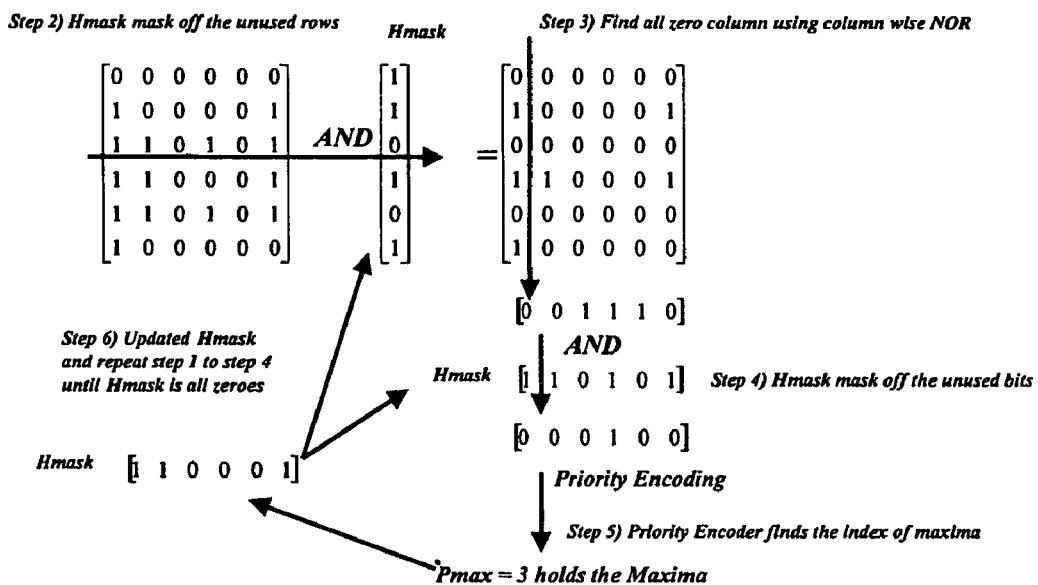
FIG. 4 illustrates an example, using matrices, of steps for finding maxima according to an embodiment of the present invention.

FIG. 4 illustrates an example, using matrices, of steps for finding maxima according to an embodiment of the present invention. The example is for a Master set $K_S$ = {2, 4, 9, 5, 9, 3}. The task is to find the maxima of subset S = {2, 4, 5, 3}, given that the $H_{MASK}$ for subset S with reference to $K_S$ = {1, 1, 0, 1, 0, 1}. The method to find the minima is substantially the same as the method to find the maxima by swapping the row and column in the search engine. To find the minima, the row in the maxima searching method is replaced by the column in the minima searching method whereas the column in the maxima searching method is replaced by the row in the minima searching method.

The seventh step in accordance with the method according to an embodiment of the present invention is to mask the column of the matrix C using $L_{MASK}$ vector. A new matrix is obtained as:

$$C_{Step7} = C \text{ AND } L_{MASK} \quad (14)$$

$$C_{Step7} = \begin{bmatrix} C_{0,0} & C_{0,1} & C_{0,2} & \ldots & C_{0,N-1} \\ C_{1,0} & C_{1,1} & C_{1,2} & \ldots & C_{1,N-1} \\ C_{2,0} & C_{2,1} & C_{2,2} & \ldots & C_{2,N-1} \\ \ldots & \ldots & \ldots & \ldots & \ldots \\ C_{N-1,0} & C_{N-1,1} & C_{N-1,2} & \ldots & C_{N-1,N-1} \end{bmatrix}$$

$$\text{AND } [L_0 \; L_1 \; L_2 \; \ldots \; L_{N-1}]$$

$$C_{Step1} = \begin{bmatrix} L_0 \cdot C_{0,0} & L_1 \cdot C_{0,1} & L_2 \cdot C_{0,2} & \ldots & L_{N-1} \cdot C_{0,N-1} \\ L_0 \cdot C_{1,0} & L_1 \cdot C_{1,1} & L_2 \cdot C_{1,2} & \ldots & L_{N-1} \cdot C_{1,N-1} \\ L_0 \cdot C_{2,0} & L_1 \cdot C_{2,1} & L_2 \cdot C_{2,2} & \ldots & L_{N-1} \cdot C_{2,N-1} \\ \ldots & \ldots & \ldots & \ldots & \ldots \\ L_0 \cdot C_{N-1,0} & L_1 \cdot C_{N-1,1} & L_2 \cdot C_{N-1,2} & \ldots & L_{N-1} \cdot C_{N-1,N-1} \end{bmatrix}$$

The eight step in accordance with the method according to an embodiment of the present invention is to generate a one dimension matrix $C_{STEP8}$ by performing a NOR operation on the logical values of the row in $C_{STEP7}$. The logical function $f(C_X)$ defines the $$f(C_X) = \overline{(L_0 \cdot C_{X,0} + L_1 \cdot C_{X,1} + L_2 \cdot C_{X,2} + \ldots + L_{N-1} \cdot C_{X,N-1})} \quad (15)$$

NOR function of all the logical values in a single row X as:

Therefore, the matrix $C_{STEP7}$ can be expressed as:

$$C_{Step8} = \begin{bmatrix} f(C_0) \\ f(C_1) \\ f(C_2) \\ \ldots \\ f(C_{N-1}) \end{bmatrix} \quad (16)$$

where

X is an integer $0 \leq X \leq N-1$ $f(C_X)$ is a logical variable 0 or 1

This means that each row of $C_{STEP8}$ will be set to 1 if all the row values of $C_{STEP7}$ are 0. The logical function $f(C_X)$ is used to detect if the index X comprises the smallest priority key. If the row X is of all logical 0, this means that the priority key for index X is smaller than all the priority keys.

The ninth step in accordance with the method according to an embodiment of the present invention is to mask the row of the matrix $C_{STEP8}$ using $L_{MASK}$ vector. A new matrix is obtained as:

$$C_{Step9} = C_{Step8} \cdot L_{MASK} \quad (17)$$

$$C_{Step9} = \begin{bmatrix} f(C_0) \\ f(C_1) \\ f(C_2) \\ \ldots \\ f(C_{N-1}) \end{bmatrix} \text{ AND } \begin{bmatrix} L_0 \\ L_1 \\ L_2 \\ \ldots \\ L_{N-1} \end{bmatrix}$$

$$C_{Step9} = \begin{bmatrix} L_0 \cdot f(C_0) \\ L_1 \cdot f(C_1) \\ L_2 \cdot f(C_2) \\ \ldots \\ L_{N-1} \cdot f(C_{N-1}) \end{bmatrix}$$

The $L_{MASK}$ vector is used to mask off the unwanted or invalid input index. For a given index X which did not have an input priority key or for which the input key is ignored, the masked input $L_X$ is set to 0 which will ensure the output result of $L_X \cdot f(C_X)$ returns logical 0. For any index X with a valid priority key, the output result of $L_X \cdot f(C_X)$ depends on the logical function $f(C_X)$. If the $f(C_X)$ returns logic 1, this indicates the associated index X has the smallest priority key (minima).

The tenth step in accordance with the method according to an embodiment of the present invention is similar to the way the maxima are found, i.e., the matrix $C_{STEP9}$ might return the search result which has two logical 1 in the vector. This indicates there are two input phys comprises the minima. A priority encoder is preferably employed to resolve this issue. Either an LSB priority encoder or MSB priority encoder is preferably employed to return a single index for the minima.

$$C_{Step9} = \begin{bmatrix} L_0 \cdot f(C_0) \\ L_1 \cdot f(C_1) \\ L_2 \cdot f(C_2) \\ \ldots \\ L_{N-1} \cdot f(C_{N-1}) \end{bmatrix}$$

where
  X is an integer $0 \leq X \leq N-1$
  $L_X \cdot f(C_X)$ is a logical 0 or 1

$P_{MIN}$=minimum phy index of $C_{step9}$ for any
  $L_X \cdot f(C_X)=1$ \quad (18a)

$P_{MIN}$=maximum phy index of $C_{step9}$ for any
  $L_X \cdot f(C_X)=1$ \quad (18b)

The equation (18a) is used to find the smallest phy index that indicates the minima. An LSB priority encoder is preferably employed. The equation (18b) is used to find the highest phy index that indicates the minima. An MSB priority encoder is preferably employed.

The eleventh step in accordance with the method according to an embodiment of the present invention is to repeatedly find the next minima for the given subset, the $L_{MASK}$ has to be updated by setting the $LP_{MIN}$ value to 0 and repeat step 7 to step 10. This will ignore the minima from the current search cycle in the C matrix so that a new minima can be found from the next search cycle. This process should be repeated until the $L_{MASK}$ subset comprises all logical 0.

Figure 5:
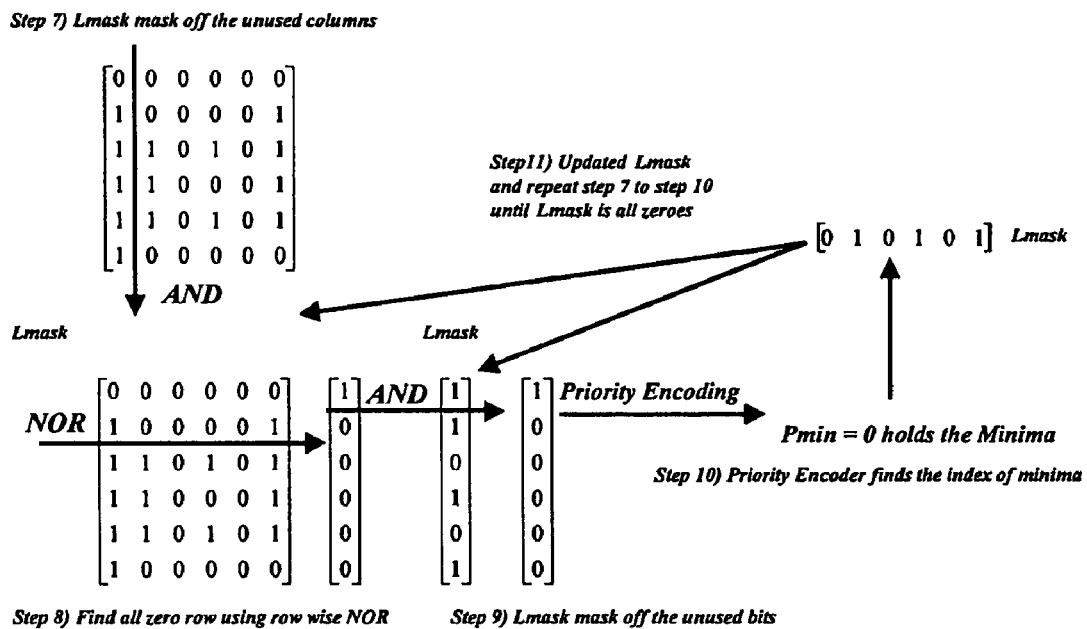
FIG. 5 illustrates an example, using matrices, of steps for finding minima according to an embodiment of the present invention.

FIG. 5 illustrates an example, using matrices, of steps for finding minima according to an embodiment of the present invention. The example is for a Master set $K_S$={2, 4, 9, 5, 9, 3}. The task is to find the minima of subset S={2, 4, 5, 3}, given that the $L_{MASK}$ for subset S with reference to $K_S$={1, 1, 0, 1, 0, 1}.

The above-referenced material discusses a mechanism for finding the maxima and minima of a subset. However, further embodiments of the present invention are capable of finding a specific rank of priority key from the subset, for instance to find the 5th highest priority key from the given subset.

There are two methods to find the specific rank of priority key from the subset. The first method uses the same methodology of finding the maxima or minima to loop Z times or (N+1−Z) times to find the Z rank of the priority key. For example, if the subset has 5 priority keys and the intent is to find the 2nd highest priority key, then loop twice using the finding maxima methodology to return the 2nd highest priority key. If the 4th highest priority key is desired, loop twice as well (5+1−4) to find the 2nd smallest priority key using the finding minima methodology. The 2nd smallest priority key in a subset includes six priority keys equal to the 4th highest priority key. The following equations define which methodologies should be used to find the specific rank of the key:

set N=the total number of subset keys set Z=the Zth rank of maxima in the subset set maxima(X)=the return maxima that loop 'X' times using the finding maxima algorithm set minima(X)=the return minima that loop 'X' times using the finding minima algorithm set $K_Z$=the Zth priority key we want to find $$K_Z \begin{cases} minima(N+1-Z), & \text{if}\left(Z > \dfrac{N}{2}\right) \\ maxima(Z), & \text{if}\left(Z \leq \dfrac{N}{2}\right) \end{cases} \quad (19)$$

The second method for finding specific rank from the subset is more detailed and is described in the following section.

Figure 6:
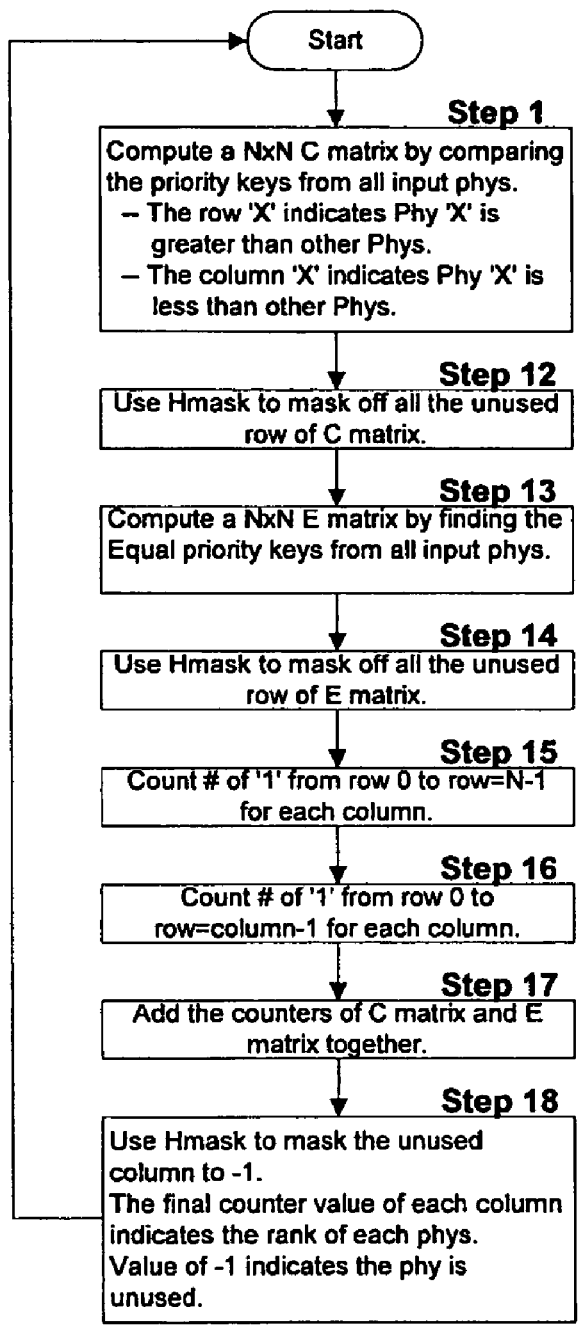
FIG. 6 is a flow chart showing steps in a method for finding a specified rank from a subset according to an embodiment of the present invention.

The following steps describe another method to find the specified rank from a subset. FIG. 6 is a flow chart showing steps in a method for finding a specified rank from a subset according to an embodiment of the present invention;

The twelfth step in accordance with the method according to an embodiment of the present invention is to mask the row of the matrix C using $H_{MASK}$ vector. A two dimensional matrix is obtained, as shown in equation (9).

The thirteenth step in accordance with the method according to an embodiment of the present invention is to compute a two dimensional Equivalence Matrix using the master set. The matrix $E_{[N-1][N-1]}$ comprises N row×N columns which value is defined as:

$E_{[i][j]}=1$ if $(K_{[i]}=K_{[j]}$ and $\neq j)$ 0 otherwise where
  i=number of row and $0 \leq i \leq N-1$
  j=number of column and $0 \leq j \leq N-1$ Therefore, the matrix E is a two dimensional vector consisting of N×N logical variables defined as:

$$\mathbb{E} = \begin{bmatrix} \mathbb{E}(\mathbb{K}_0 = \mathbb{K}_0) & \mathbb{E}(\mathbb{K}_0 = \mathbb{K}_1) & \mathbb{E}(\mathbb{K}_0 = \mathbb{K}_2) & \dots & \mathbb{E}(\mathbb{K}_0 = \mathbb{K}_{N-1}) \\ \mathbb{E}(\mathbb{K}_1 = \mathbb{K}_0) & \mathbb{E}(\mathbb{K}_1 = \mathbb{K}_1) & \mathbb{E}(\mathbb{K}_1 = \mathbb{K}_2) & \dots & \mathbb{E}(\mathbb{K}_1 = \mathbb{K}_{N-1}) \\ \dots & \dots & \dots & \dots & \dots \\ \mathbb{E}(\mathbb{K}_{N-1} = \mathbb{K}_0) & \mathbb{E}(\mathbb{K}_{N-1} = \mathbb{K}_1) & \mathbb{E}(\mathbb{K}_{N-1} = \mathbb{K}_2) & \dots & \mathbb{E}(\mathbb{K}_{N-1} = \mathbb{K}_{N-1}) \end{bmatrix} \quad (20)$$

$$\mathbb{E} = \begin{bmatrix} \mathbb{E}_{0,0} & \mathbb{E}_{0,1} & \mathbb{E}_{0,2} & \dots & \mathbb{E}_{0,N-1} \\ \mathbb{E}_{1,0} & \mathbb{E}_{1,1} & \mathbb{E}_{1,2} & \dots & \mathbb{E}_{1,N-1} \\ \dots & \dots & \dots & \dots & \dots \\ \mathbb{E}_{N-1,0} & \mathbb{E}_{N-1,1} & \mathbb{E}_{N-1,2} & \dots & \mathbb{E}_{N-1,N-1} \end{bmatrix}$$

where
 i is an integer $0 \leq i \leq N-1$
 j is an integer $0 \leq j \leq N-1$
 $E_{[i][j]}$ is a logical variable 0 or 1

$$E_{[i][j]} = \begin{cases} 1 \text{ when } (K_i = K_j) \text{ and } (i \neq j) \\ 0 \text{ otherwise} \end{cases}$$

The fourteenth step in accordance with the method according to an embodiment of the present invention is to mask the row of the matrix E using $H_{MASK}$ vector. A two dimensional matrix is obtained, as below:

$$\mathbb{E}_{Step14} = \mathbb{E} \text{ AND } \mathbb{H}_{MASK} \quad (21)$$

$$\mathbb{E}_{Step14} = \begin{bmatrix} \mathbb{H}_0 \cdot \mathbb{E}_{0,0} & \mathbb{H}_0 \cdot \mathbb{E}_{0,1} & \mathbb{H}_0 \cdot \mathbb{E}_{0,2} & \dots & \mathbb{H}_0 \cdot \mathbb{E}_{0,N-1} \\ \mathbb{H}_1 \cdot \mathbb{E}_{1,0} & \mathbb{H}_1 \cdot \mathbb{E}_{1,1} & \mathbb{H}_1 \cdot \mathbb{E}_{1,2} & \dots & \mathbb{H}_1 \cdot \mathbb{E}_{1,N-1} \\ \mathbb{H}_2 \cdot \mathbb{E}_{2,0} & \mathbb{H}_2 \cdot \mathbb{E}_{2,1} & \mathbb{H}_2 \cdot \mathbb{E}_{2,2} & \dots & \mathbb{H}_2 \cdot \mathbb{E}_{2,N-1} \\ \dots & \dots & \dots & \dots & \dots \\ \mathbb{H}_{N-1} \cdot \mathbb{E}_{N-1,0} & \mathbb{H}_{N-1} \cdot \mathbb{E}_{N-1,1} & \mathbb{H}_{N-1} \cdot \mathbb{E}_{N-1,2} & \dots & \mathbb{H}_{N-1} \cdot \mathbb{E}_{N-1,N-1} \end{bmatrix}$$

The sixth step in accordance with the method according to an embodiment of the present invention is to compute a one dimension matrix $C_{STEP15}$ by counting the number of logical 1 in each column of matrix $C_{STEP1}$. The function $f(C_X)$ defines the summation of all $$f(\mathbb{C}_X) = \sum_{Y=0}^{Y=N-1} \mathbb{H}_Y \cdot \mathbb{C}_{Y,X} \quad (22)$$

the logical values in a single column X.

For example, if the matrix $C_{STEP1}$ is a 3×3 matrix then, the result is:

$f(C_0) = H_0 \cdot C_{0,0} + H_1 \cdot C_{1,0} + H_2 \cdot C_{2,0}$ $f(C_1) = H_0 \cdot C_{0,1} + H_1 \cdot C_{1,1} + H_2 \cdot C_{2,1}$ $f(C_2) = H_0 \cdot C_{0,2} + H_1 \cdot C_{1,2} + H_2 \cdot C_{2,2}$ Therefore, the matrix $C_{STEP15}$ can be expressed as:

$$C_{Step15} = [f(C_0) f(C_1) f(C_2) \dots f(C_{N-1})] \quad (23)$$

where
 X is an integer $0 \leq X \leq N-1$
 $f(C_X)$ is an integer $0 \leq f(C_X) \leq N-1$ The sixteenth step in accordance with the method according to an embodiment of the present invention is to compute a one dimension matrix $E_{STEP16}$ by counting the number of logical 1 in each column of $E_{STEP14}$. The function $g(E_X)$ defines the $$g(E_x) = \sum_{Y=0}^{Y=X-1} H_Y \cdot E_{Y,X} \quad (24)$$

summation of all the logical values from row 0 to row (X−1) in a single column X.

For example, if the matrix $E_{STEP14}$ is a 3×3 matrix, the result is:

$g(E_0) = H_0 \cdot E_{0,0}$ $g(E_1) = H_0 \cdot E_{0,1} + H_1 \cdot E_{1,1}$ $g(E_2) = H_0 \cdot E_{0,2} + H_1 \cdot E_{1,2} + H_2 \cdot E_{2,2}$ Therefore, the matrix $E_{STEP16}$ can be expressed as:

$$E_{Step16} = [g(E_0) g(E_1) g(E_2) \dots g(E_{N-1})] \quad (25)$$

where
 X is an integer $0 \leq X \leq N-1$
 $g(E_X)$ is an integer $0 \leq g(E_X) \leq X-1$ The summation function $f(C_X)$ is used to indicate the total number of priority keys that is greater than the priority key of the index X. If the summation of $f(C_X)$ is zero, this means that index X has the highest priority key. For example, given a subset $\{2, 4, 4, 9, 5, 9, 3\}$ the $C_{STEP3}$ should return $\{6, 3, 3, 0, 2, 0, 5\}$. This means that the priority key 2 is ranked 7th in the subset and has six priority keys greater than the priority key 2. If the given subset comprises equal weight priority keys, for instance the priority key 4 and 9 in the above example, the function $g(E_X)$ is preferably employed to solve this problem. As shown in the above example, the priority key 9 from index 3 and index 5 are both ranked the 1st. From equation (25), the $E_{STEP3}$ matrix returns $\{0, 0, 1, 0, 0, 1, 0\}$. By adding $C_{STEP3}$ and $E_{STEP3}$ together, a new matrix $\{6, 3, 4, 0, 2, 1, 5\}$ is obtained. This yields the final rank of the priority keys in the given subset. The equation (24) defines the smallest phy index as the highest rank in equal priority key condition. The equation (26) defined as below will give the highest phy index as the highest rank in equal priority key condition.

$$g(E_x) = \sum_{Y=X}^{Y=N-1} H_Y \cdot E_{Y,X} \qquad (26)$$

The seventeenth step in accordance with the method according to an embodiment of the present invention is to add together $C_{STEP15}$ and $E_{STEP16}$ to form a new matrix $R_{STEP17}$. The $R_{STEP17}$ indicates the rank of the priority keys in a given subset.

$$R_{step17} = C_{step15} + E_{step16}$$

$$R_{step17} = [f(C_0) f(C_1) f(C_2) \ldots f(C_{N-1})] + [g(E_0) g(E_1) g(E_2) \ldots g(E_{N-1})]$$

$$R_{step17} = [f(C_0) + g(E_0), f(C_1) + g(E_1), f(C_2), + g(E_2), \ldots, f(C_{N-1}) + g(E_{N-1})]$$

$$R_{step17} = [R_0 R_1 R_2 \ldots R_{N-1}] \qquad (27)$$

where
X is an integer $0 \leq X \leq N-1$
$R_X = f(C_X) + g(E_0)$ and $0 \leq R_X \leq N-1$ Note that the $f(C_X)$ and $g(E_X)$ are not defined as logical function. Therefore, the matrix value $R_X$ is a summation function, not a logical OR function.

The eighteenth step in accordance with the method according to an embodiment of the present invention is to mask the column of the matrix $R_{STEP17}$ using $H_{MASK}$ vector. The column value $R_X$ will be replaced with $-1$ if the mask value $H_X$ is logical 0. A column value with $-1$ indicates that the priority key for the given index is invalid or ignored and does not have an associated rank. The equation (27) can be expressed as below:

$$R_{step18} = [R_0 R_1 R_2 \ldots R_{N-1}] \qquad (28)$$

where X is an integer $0 \leq X \leq N-1$ $$R_X = \begin{cases} R_x & \text{, if } H_x = 1 \\ -1 & \text{, if } H_x = 0 \end{cases}$$

Figure 7:
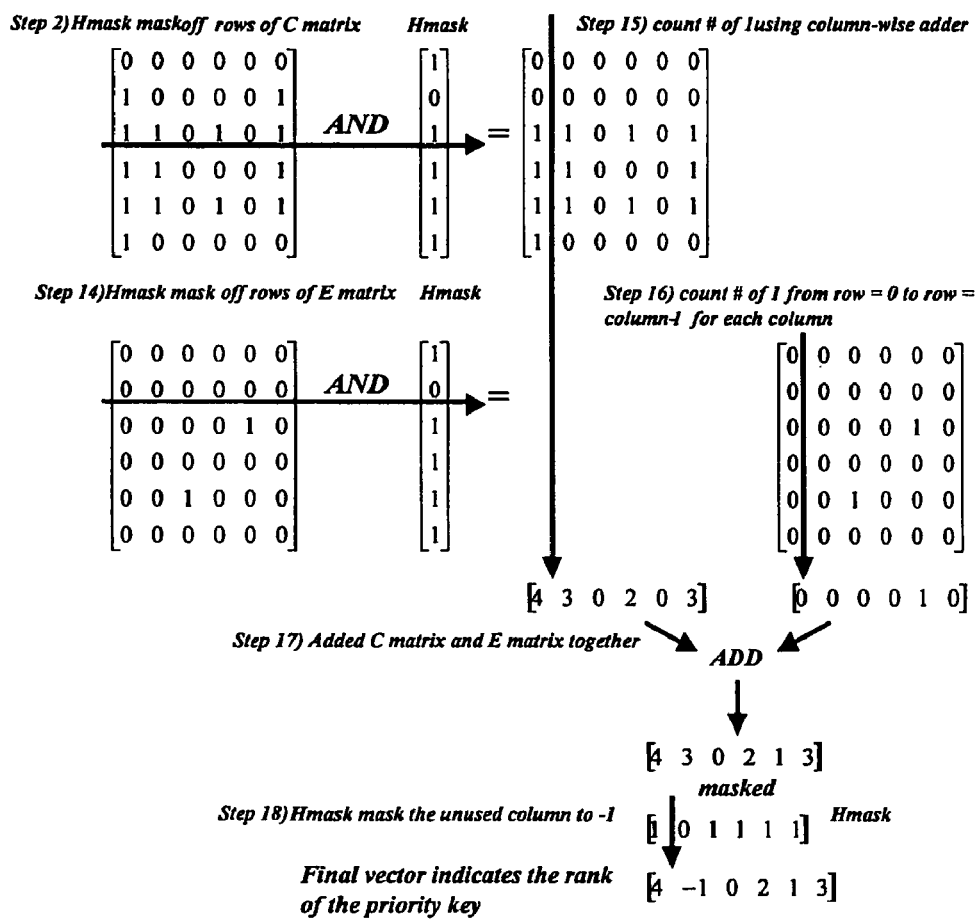
FIG. 7 illustrates an example, using matrices, of steps for finding a specific rank from a subset according to an embodiment of the present invention.

FIG. 7 illustrates an example, using matrices, of steps for finding a specific rank from a subset according to an embodiment of the present invention. This example is for a Master set $K_S = \{2, 4, 9, 5, 9, 3\}$. The task is to sort the given subset $S = \{2, 9, 5, 9, 3\}$, given that the $H_{MASK}$ for subset S with reference to $K_S = \{1, 0, 1, 1, 1, 1\}$.

Figure 8:
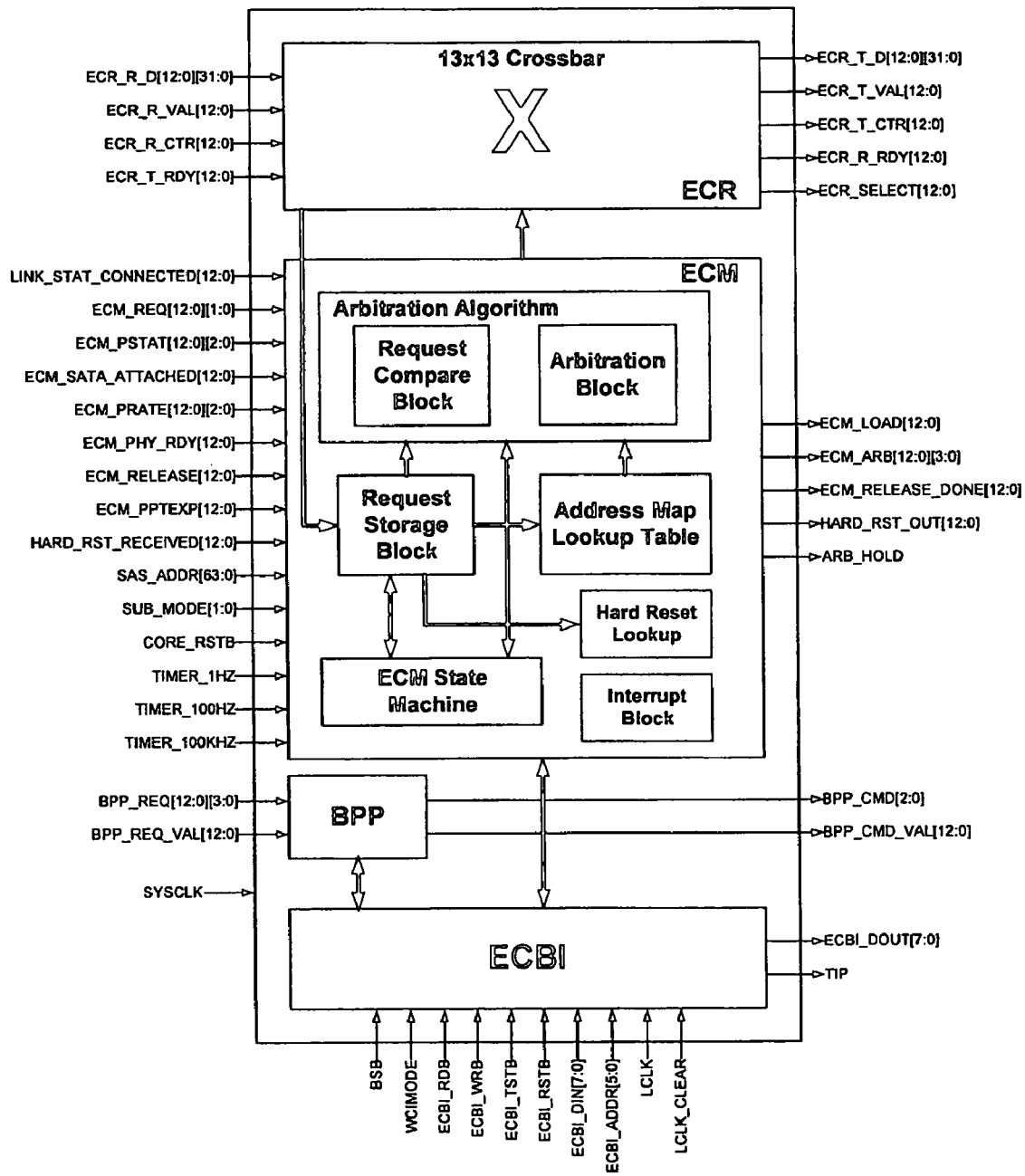
FIG. 8 illustrates an exemplary implementation of a search mechanism according to an embodiment of the present invention.

FIG. 8 illustrates an exemplary implementation of a search mechanism according to an embodiment of the present invention. Embodiments of the present invention can be implemented in an Application Specific Standard Integrated Circuit Product (ASSP). The Search Engine can be implemented in a functional block (TSB) of 6 and 12 port Expanders called ECMR, which incorporates the functionality of Expander Connection Manager (ECM), Expander Connection Router (ECR), and Broadcast Primitive Processor (BPP). The Search mechanism described by embodiments of the present invention can be in the Request Compare sub-block in the ECMR as shown in FIG. 8.

In a 12 port Expander implementation, the Maxima and Minima searching method can be implemented in logic gates using ASIC technology. However, it should be noted that the same methodology could be implemented using other means of realization such as using a combination of software and hardware. One possible implementation utilizes programmable logic devices such as FPGA to implement the search engine. Other implementations include the use of software/firmware running on a microprocessor or a programmable engine to realize the processing flow described by this invention. Other products can implement a mechanism according to an embodiment of the present invention in an ECMR_LT block. Such embodiments can be provided, in whole or in part, on a computer-readable medium storage statements and instructions which, when executed perform steps of methods according to embodiments of the present invention.

In summary, embodiments of the present invention provide a mechanism, or method, to find the maxima from a given set $K_S = \{K_0, K_1, K_2, \ldots, K_{N-1}\}$. A method, or mechanism, is also provided to find the minima from a given set $K_S = \{K_0, K_1, K_2, \ldots, K_{N-1}\}$. A further method, or mechanism, is provided to find a specific Rth rank from a given set $K_S = \{K_0, K_1, K_2, \ldots, K_{N-1}\}$.

The methods can implement a comparison matrix (Step 1) having one or more of the following features: comprises N rows and N columns where N is the total number of keys in the master set; the row index M indicates the input key $K_M$ is greater than any other input keys in the given set $K_S$; and the column index M which is inverse symmetrical to the row index M, in other words the input key $K_M$ is less than and equal to any other input keys in the given set $K_S$.

The methods can implement a subnet mask having one or more of the following features: subset mask with length equal to the total number of keys; subset mask with valid input key index set to logic 1 and invalid (or unwanted) input key index set to logic 0; any valid values to represent logic 1 or logic 0 as mentioned above.

The process of masking off unwanted or invalid input keys (Step 2) can include the step of masking-off the rows of the comparison matrix with the subset mask.

The process of finding an all zero column using column-wise NOR function (step 3) can include one or more of the following steps or features: NOR all the columns of the N rows×N columns matrix to produce 1 row×N columns matrix with each column representing index position of each input keys; any valid values to represent all zero column in the column-wise operation; any valid function to detect all zero column in the column-wise operation.

The process of masking off unwanted or invalid input keys (step 4) can include masking-off the columns of the process described above. The final matrix can indicate the input index/indices of maxima.

A priority encoder can be used to find the index of maxima (step 5), including one or more of the following: use Most Significant Bit priority encoder to find the maxima with the highest index number; use Least Significant Bit priority encoder to find the maxima with the least index number.

Processes or methods according to the present invention can be used to repeatedly find the next maxima.

The process of masking off unwanted or invalid input keys (Step 7) can include masking-off the columns of the comparison matrix with the subset mask.

The process of finding all zero row using row-wise NOR function (step 8) can include one or more of: NOR all the columns of the N rows×N columns matrix to produce N rows×1 column matrix with each row represents index position of each input keys; any valid values to represents all zero row in the row-wise operation; or any valid function to detect all zero row in the row-wise operation The process of masking off unwanted or invalid input keys (step 9) can include masking-off the rows. The final matrix indicates the input index/indices of minima.

A priority encoder can be implemented to find the index of minima (step 10) including one or more of: using Most Significant Bit priority encoder to find the maxima with the highest index number; using Least Significant Bit priority encoder to find the maxima with the least index number.

Processes or methods according to an embodiment of the present invention can be used to repeatedly find the next minima. Some steps can be repeated (R−1) times.

A comparison matrix can be implemented, including one or more of: a comparison N×N matrix with the row index M indicates the input $K_M$ is greater and equal to any other input keys in the given set $K_S$ with the column index inverse symmetrical to the row index (column indicates less than); a comparison N×N matrix with the row index M indicates the input $K_M$ is less than and equal to any other input keys in the given set $K_S$ with the column index inverse symmetrical to the row index (column indicates greater than); or a comparison N×N matrix with the row index M indicates the input $K_M$ is less than any other input keys in the given set $K_S$ with the column index inverse symmetrical to the row index (column indicates greater than and equal to).

The comparison matrix can be optimized diagonally to save memory since the matrix is inverse symmetrical.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A Serial Attached Small Computer System Interface expander device having a plurality of phys, the SAS expander device to establish connections between phys, the SAS expander device comprising:
    a microprocessor executing instructions to cause the microprocessor to implement a search engine and an arbiter, the search engine and the arbiter to perform the following actions:
        the search engine to compare arbitration priority keys of a source phy subset of the plurality of phys to identify a maximum arbitration priority key having an index position indicating a highest priority request source phy and to compare arbitration priority keys of a target phy subset from the plurality of phys to identify a minimum arbitration priority key having an index position indicating a lowest priority request source phy;
        the arbiter to establish a connection between the highest priority request source phy of the source phy subset and the lowest priority source phy of the target phy subset;
        the search engine and the arbiter to iteratively perform the following actions until all connections between phys have been established:
            the search engine to mask off the highest priority request source phy and the lowest priority target phy subsequent the establishment of the connection therebetween, the masking off of the highest priority request source phy producing a reduced source phy subset, the masking off of the lowest priority target phy producing a reduced target phy subset;
            the search engine to compare arbitration priority keys of the reduced source phy subset to identify, for the reduced source phy subset, a maximum arbitration priority key having an index position indicating a highest priority request source phy and to compare arbitration keys of the reduced target phy subset to identify, for the reduced target subset, a minimum arbitration priority key having an index position indicating a lowest priority request source phy; and
            the arbiter to establish a connection between the highest priority request source phy of the reduced source phy subest and the lowest priority target phy of the reduced target subset.

2. The device of claim 1 wherein the source phy subset consists of phys with OPEN requests.

3. The device of claim 2 wherein the target phy subset consists of phys encompassed in a wide port.

4. The device of claim 2 wherein the microprocessor executes further instructions to cause the microprocessor to implement a link layer processor, the link layer processor being operationally connected to the arbiter, the link layer processor to transmit an OPEN request from the highest priority request source phy of the source phy subset to the lowest priority target phy of the source phy subset.

5. The device of claim 2 wherein the link layer processor is to determine if the lowest priority target phy of the target phy subset has an OPEN request.

6. The device of claim 5 wherein if the lowest priority target phy of the target phy subset has an OPEN request, the link layer processor is to reject the OPEN request from the lowest priority target phy of the target phy subset, and to transmit the OPEN request from the highest priority source phy to the lowest priority target phy.

7. A processor-implemented method of arbitrating connection between a plurality of phys is a Serial Attached Small Computer Interface expander device, the method comprising:
    comparing arbitration keys of a source phys subset of the plurality of phys to obtain a maximum arbitration priority key having an index position indicating a highest priority request source phy;
    comparing arbitration keys of a target phys subset of the plurality of phys to obtain a minimum arbitration priority key having an index position indicating a lowest priority request source phy;
    establishing a connection between the highest priority request source phy of the source phy subset and the lowest priority target phy of the target phy subset;
    iteratively performing the following actions until all connections between phys have been established:
        masking off the highest priority request source phy and the lowest priority target phy subsequent the establishment of the connection therebetween, the masking off of the highest priority request source phy producing a reduced source phy subset, the masking off of the lowest priority target phy producing a reduced target phy subset;
        comparing arbitration priority keys of the reduced source phy subset to identify, for the reduced source phy subset, a maximum arbitration priority key having an index position indicating a highest priority request source phy;
        comparing arbitration keys of the reduced target phy subset to identify, for the reduced target subset, a minimum arbitration priority key having an index position indicating a lowest priority request source phy; and establishing a connection between the highest priority request source phy of the reduced source phy subest and the lowest priority target phy of the reduced target subset.

8. The method of claim 7 wherein the source phy subset consists of phys with OPEN requests.

9. The method of claim 8 wherein the target phy subset consists of phys encompassed in a wide port.

* * * * *

UNITED STATES PATENT AND TRADEMARK OFFICE
CERTIFICATE OF CORRECTION

PATENT NO.       : 7,958,295 B1
APPLICATION NO.  : 11/389025
DATED            : June 7, 2011
INVENTOR(S)      : Heng Liao et al.

It is certified that error appears in the above-identified patent and that said Letters Patent is hereby corrected as shown below:

Column 16, line 59, delete "and $\neq j$" and insert therefor -- and $i \neq j$ --

Signed and Sealed this
Tenth Day of April, 2012

David J. Kappos
*Director of the United States Patent and Trademark Office*